United States Patent [19]
Eickhoff et al.

[11] Patent Number: 5,172,959
[45] Date of Patent: Dec. 22, 1992

[54] ANTI-LOCK BRAKING SYSTEM FOR ALL-WHEEL DRIVE VEHICLES

[75] Inventors: Jürgen Eickhoff, Walsrode; Konrad Rode, Seelze; Henrich Riedemann, Hanover, all of Fed. Rep. of Germany

[73] Assignee: WABCO Westinghouse Fahrzeugbremsen GmbH, Hanover, Fed. Rep. of Germany

[21] Appl. No.: 798,216

[22] Filed: Nov. 26, 1991

[30] Foreign Application Priority Data

Nov. 27, 1990 [DE] Fed. Rep. of Germany ....... 4037654

[51] Int. Cl.⁵ ................... B60T 8/32; B60T 8/60; B60T 8/92; B60T 8/88
[52] U.S. Cl. .................... 303/100; 180/233; 180/248; 180/244; 303/92; 303/111
[58] Field of Search .............. 303/100, 111, 92, 96; 188/181 A, 181 C; 364/424.04, 424.03, 426.01, 426.02, 426.03, 424.1, 424.05; 180/233, 247, 248, 249, 250, 197, 244

[56] References Cited

U.S. PATENT DOCUMENTS

| | | | |
|---|---|---|---|
| 4,059,312 | 11/1977 | Jonner | 303/92 |
| 4,345,796 | 8/1982 | Reinecke | |
| 4,648,662 | 3/1987 | Fennel et al. | 303/96 X |
| 4,895,217 | 1/1990 | Hueckler et al. | 180/233 |
| 4,947,325 | 8/1990 | Iwata et al. | 180/233 X |
| 4,962,970 | 10/1990 | Jonner et al. | 180/233 X |
| 4,991,679 | 2/1991 | Fujii et al. | 180/233 |
| 5,032,995 | 7/1991 | Matsuda et al. | 180/233 X |

FOREIGN PATENT DOCUMENTS

| | | |
|---|---|---|
| 2543178 | 4/1977 | Fed. Rep. of Germany. |
| 3417019 | 11/1985 | Fed. Rep. of Germany. |
| 2933336 | 4/1986 | Fed. Rep. of Germany. |
| 3733661 | 4/1988 | Fed. Rep. of Germany. |

*Primary Examiner*—Douglas C. Butler
*Attorney, Agent, or Firm*—Marmorek, Guttman & Rubenstein

[57] ABSTRACT

An anti-lock braking system for a two-axle all-wheel drive vehicle having two intra-axle differentials and an engageable central inter-axle differential comprises a wheel sensor associated with each of the wheels for determining the rotational behavior of each of the wheels, and a four-channel electronic control circuit for providing individual wheel regulation. The electronic control circuit also detects whether the central differential is engaged or not and whether a malfunction has occurred in one of the channels. If one of the regulating channels has a malfunction and the central differential is not engaged, the electronic control circuit switches off regulation only in the malfunctioning channel. If, however, the central differential is engaged when a malfunction in one of the regulating channels has occurred, then the electronic control circuit switches off both the malfunctioning channel as well as an intact channel associated with a diagonally opposite wheel.

6 Claims, 2 Drawing Sheets

ANTI-LOCK BRAKING SYSTEM FOR ALL-WHEEL DRIVE VEHICLES

BACKGROUND OF THE INVENTION

The present invention relates to an anti-lock braking system (ABS) for all-wheel drive vehicles.

Of late, more and more all-wheel drive vehicles are being produced. In order to compensate for faulty gripping of the road by the vehicle when taking curves, such vehicles are generally equipped not only with intra-axle differentials but also with a central inter-axle differential. The driving force of the motor is then distributed via the central inter-axle differential and the intra-axle differentials to the wheels.

Instead of a central inter-axle differential, it is also possible to install a central viscous coupling between the axles. The central viscous coupling is approximately equivalent to an inserted central differential. For purposes of convenience, both a central inter-axle differential and a central viscous coupling will be referred to herein as a central differential.

If such a vehicle is also equipped with an anti-locking braking system, then reaction effects between the two axles may occur in the case of ABS-regulated braking because the two axles are connected to each other via the central differential. This leads to a decrease in the normal braking stability of the vehicle, especially when there are faults in the anti-lock braking system, and to a sudden braking performance which sometimes takes the driver of the vehicle by surprise.

An anti-locking braking system is known from DE-PS 29 33 336 (U.S. Pat. No. 4,345,796 which is incorporated herein by reference). In that prior art system, each wheel is individually regulated by a separate regulating channel in the electronic control unit of the ABS system. That prior art system also discloses a safety circuit which senses and monitors the condition of the wheel sensors and the electronic components of the ABS system. When a fault is detected in a channel of the anti-lock braking system, either that channel alone is switched off, or both channels of the affected diagonal are switched off. In the first case, the affected wheel is no longer regulated by the ABS system and it may become locked in case of severe braking, while in the second case both wheels of the affected diagonal may become locked.

Switching off the entire anti-lock braking system in case of a malfunction is also known. In such case, the system reverts to normal braking operation without any regulation, which could result in all wheels being locked.

These known procedures for dealing with a fault or malfunction in the anti-lock braking system were developed for vehicles which do not have a central differential, and result in certain disadvantages when employed in all-wheel drive vehicles having an inserted central differential.

For example, if the affected channel alone is switched off, the inserted central differential or central viscous coupling can lead to uncontrolled slippage of the intact axle in a two-axle all-wheel drive vehicle and thus to instability of the vehicle.

On the other hand, if both channels along an affected diagonal are switched off, an undesirable prolongation of the braking path and reduced lateral steering results if the central differential is not positively engaged.

Furthermore, if the entire anti-locking braking system is switched off, a complete loss of lateral steering may occur because all the wheels may lock.

Accordingly, it is the general object of the instant invention essentially to maintain in an all-wheel drive vehicle having a central differential or a central viscous coupling the usual, good braking ability afforded by an intact anti-lock braking system as much as possible even in case of a partial malfunction in the anti-lock braking system.

SUMMARY OF THE INVENTION

This and other objects of the invention are achieved by means of the present invention which provides an anti-lock braking system for an all-wheel drive vehicle having first and second axles, first and second intra-axle differentials on the first and second axles, and an engageable inter-axle differential which interconnects the two axles. The inventive anti-lock braking system comprises a sensor associated with each wheel of the vehicle for sensing the rotational behavior of each of the wheels, and a multi-channel electronic control unit for controlling the braking effort applied to each of the wheels, the multi-channel electronic control unit having a separate electronic channel associated with each of the wheels. The electronic control unit which comprises a microprocessor also determines if the central differential is engaged or not, and whether a malfunction has occurred in one of the regulating channels. If a malfunction is detected in one of the regulating channels and if the central differential is not engaged, the electronic control unit will switch off ABS regulation only in the malfunctioning channel. The affected wheel alone will then be subject to normal braking. However, if the central differential is engaged when a malfunction in one of the channels is detected, the electronic control unit will switch off regulation not only in the malfunctioning channel, but also in the intact channel associated with a diagonally opposite wheel. In this case, if the central differential is engaged, any instability arising because ABS regulation has been switched off in one wheel due to a malfunction in a channel will be cancelled out by also switching off ABS regulation in a diagonally opposite wheel.

BRIEF DESCRIPTION OF THE DRAWINGS

The invention shall be explained in further detail through the drawings, wherein.

DETAILED DESCRIPTION OF A PREFERRED EMBODIMENT

Figure 1:
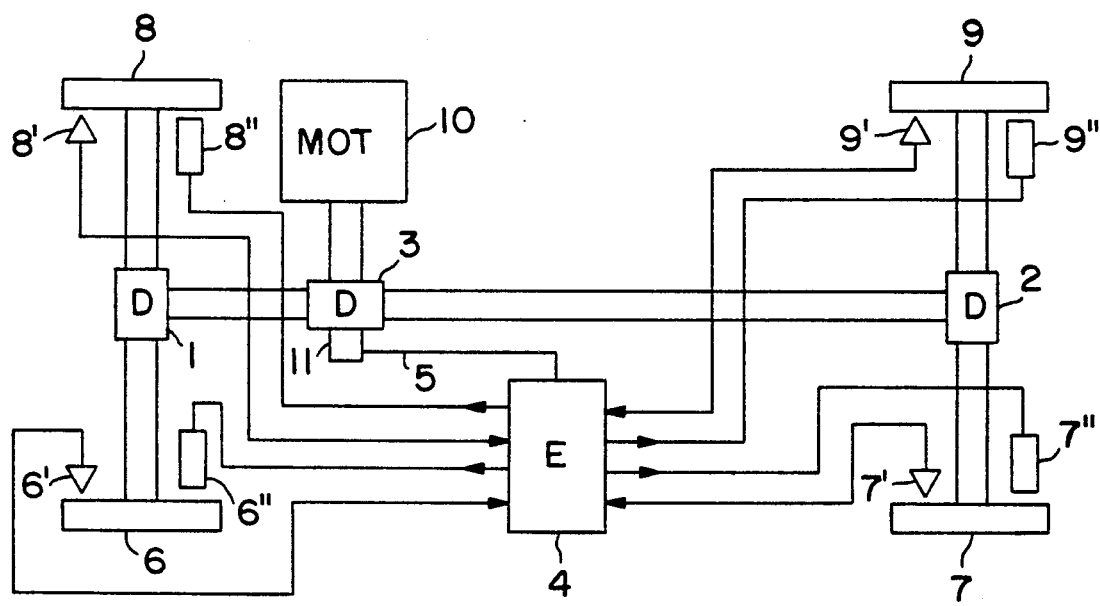
FIG. 1 is a schematic drawing of an embodiment of the invention.

The drawing shows a schematic representation of an all-wheel drive vehicle having an electronic anti-lock braking system. The vehicle is equipped with two axles on which are mounted wheels (6) to (9) as shown. The wheels on each axle are driven via intra-axle differentials (1) and (2). The above-mentioned intra-axle differentials are connected to each other via a central inter-axle differential (3) which is driven by a motor (10).

The anti-lock braking system comprises four wheel sensors (6', 7', 8', 9') mounted on the wheels (6) to (9) which detect the rotational behavior of the wheels. The wheel sensors (6', 7', 8', 9') are connected to locking-protection electronics (4). The electronics (4) include a microprocessor and a separate channel for each of the wheels (6) to (9). In response to signals received from the wheel sensors (6', 7', 8', 9'), the electronics (4) control the operation of four solenoid valves which precede the braking cylinders of each of the individual wheels. During regulation of the ABS, a brake slippage of approximately 20% is effected. The solenoid valves and braking cylinders which form part of the brakes are shown schematically as 6", 7", 8" and 9" in FIG. 1.

Since a four-channel anti-lock braking system with separate channels for individual wheel regulation is known per se, it is not shown in further detail. The electronics (4) also monitors the condition of the wheel sensors (6', 7', 8', 9'), the wiring, and other essential ABS and electronic components. For example, the electronics (4) may include a self-test program by means of which it actively checks the condition of the wheel sensors (6', 7', 8', 9'), the wiring, and other electronic components for interruptions and short circuits.

The electronics (4) also receive signals via a line (5) indicating whether the central differential (3) is positively engaged or not. For example, it is possible to obtain this information via a microswitch 11 shown) installed on the central differential (3) itself. It is also possible to obtain this information from some other location, e.g., from the driver's central differential shut-off switch.

The thus-produced signal causes the regulating logic of the locking-protection electronics (4) to reconfigure operation of the ABS system in the event one of the regulating channels were to malfunction. If a malfunction in one of the channels is detected, and if the central differential (3) is not engaged, the electronics (4) only switch off regulation by the malfunctioning channel. Regulation will continue by the three remaining, intact channels. In such case, the switched-off channel may lead to locking of the affected wheel in case of unfavorable wheel conditions. However, sufficient lateral stability of the vehicle is still ensured by the three intact channels which continue to regulate.

However, if one of the regulating channels malfunctions and the central differential (3) is engaged, the electronics (4) will also switch off regulation by the intact channel associated with the wheel which is diagonally across from the affected wheel. In this case, two diagonally opposite wheels may become locked. The lateral stability of the vehicle continues to be substantially maintained, however, by the still regulating channels of the other diagonal. Furthermore, reaction effects between the two axles via the engaged central differential (3) are avoided as the same conditions now prevail for both axles and cancel out, i.e., along each axle, one wheel runs regulated and one wheel runs unregulated.

Some anti-lock braking systems are designed for modified individual regulation (MIR) whereby the regulating channels for the front wheels exchange information about the dynamic behavior of their wheels. As a further measure, the electronics (4) of the present invention switch off such modified individual regulation so that all still regulating channels switch over to purely individual regulation in case of a malfunctioning regulating channel. Any regulating logic for the reduction of yaw moments that may be applied to the front axle is also switched off. As a result, optimal braking power is ensured to the regulated wheels, and influence by a malfunctioning wheel upon the regulation of the still intact wheels is excluded.

Finally, when a sensor malfunction occurs on a wheel, the electronics (4) will utilize the wheel speed signal of the other wheel on the same axle to assist in the control of the malfunctioning channel. Instantaneous locking of the affected wheel can be avoided thereby. The engaged central differential is thus prevented from negatively influencing the other wheels.

Figure 2:
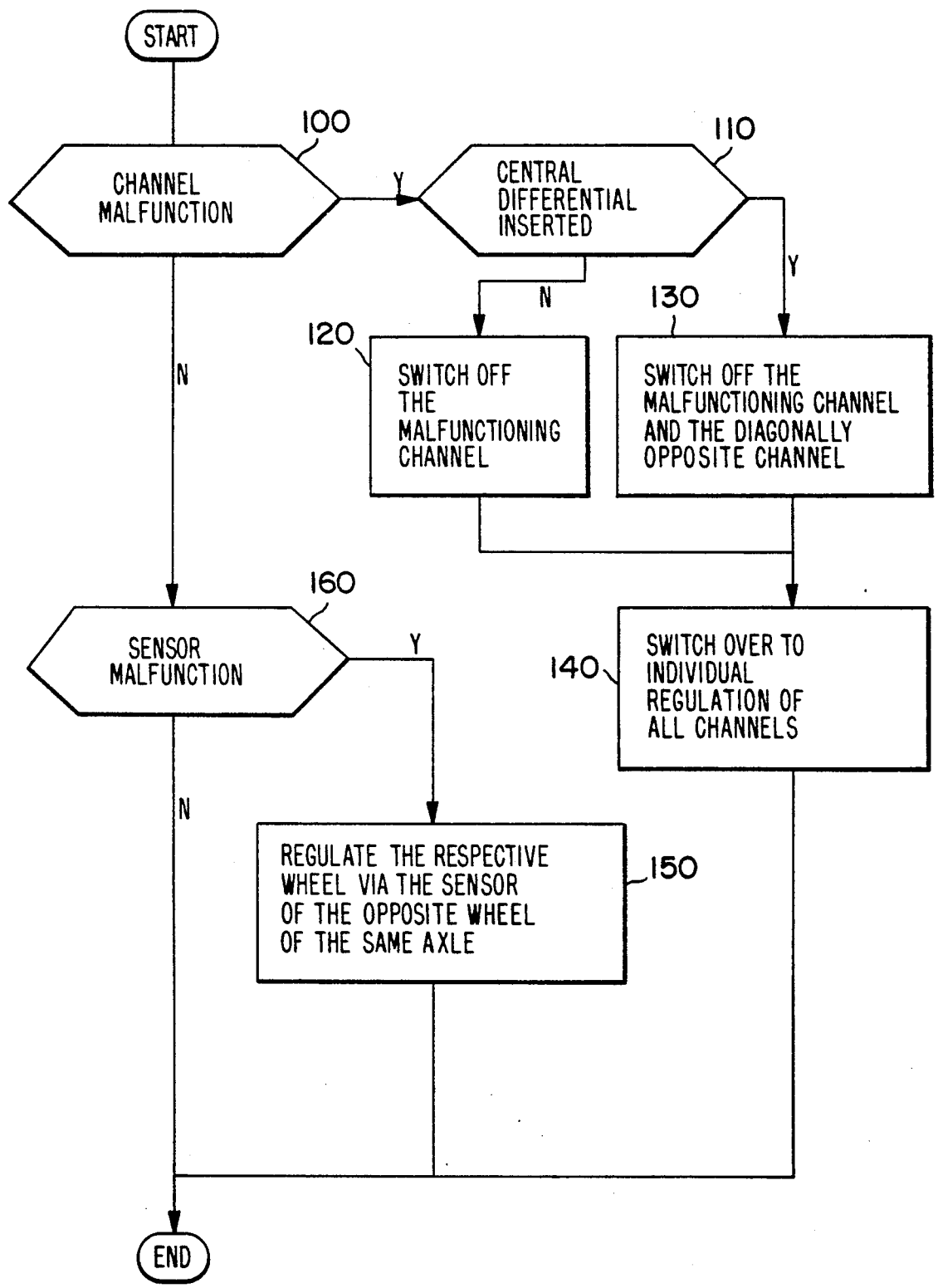
FIG. 2 is a flowchart of a program for carrying out the steps of the invention.

FIG. 2 shows a flowchart for carrying out the steps described above which can be programmed into the microprocessor of the electronics (4). Box 100 illustrates the first step in this program according to which, as described above, a self-test program is run which checks each of the channels associated with the wheels to determine if a malfunction has occurred. If a channel malfunction is detected, the program next determines, by means of the position of the microswitch (11) for example, whether the central differential is inserted or not (box 110). If the central differential is not inserted, the program instructs the electronics (4) to switch off ABS regulation for the malfunctioning channel only (box 120). If, however, the central differential is inserted, the program instructs the electronics (4) to switch off ABS regulation for the malfunctioning channel and for the channel of a diagonally opposite wheel (box 130). In either case, the electronics (4) then switches over to individual ABS regulation of all remaining channels (box 140) and the program is completed. Returning to box 100, if no channel malfunction is detected, the program next checks to see if there is a malfunction in one of the wheel sensors (160). If a malfunction in one of the wheel sensors is detected, the program instructs the electronics (4) to regulate the wheel associated with the malfunctioning wheel sensor based on the signals produced by a wheel sensor associated with another wheel on the same axle (box 150).

While the invention has been described by reference to specific embodiments, this was for purposes of illustration only and should not be construed to limit the spirit or the scope of the invention Numerous equivalent alternatives will be apparent to those skilled in the art.

We claim:

1. An anti-lock braking system for an all-wheel drive vehicle having first and second axles, wheels mounted on said first and second axles, brake cylinders and solenoid valves associated with each of said wheels, first and second intra-axle differentials on said first and second axles, and an engageable inter-axle differential which interconnects said first and second axles, comprising sensing means associated with each of said wheels for sensing a rotational behavior of each of said wheels, and for producing output signals in response thereto, and electronic regulating means for receiving said output signals from said sensing means and for regulating a braking effort applied to each of said wheels based on said output signals, said electronic regulating means further including means for determining whether said inter-axle differential is engaged or not, for determining whether a malfunction associated with one of said wheels has occurred, for switching off regulation of the braking effort applied to said one wheel, and for also switching off regulation of the braking effort applied to a diagonally opposite wheel if said inter-axle differential is engaged.

2. The anti-lock braking system of claim 1 wherein, after said malfunction has occurred, said electronic regulating means regulates the braking effort applied to each wheel still being regulated based on the output signals produced by said sensing means associated with each of said still regulated wheels.

3. The anti-lock braking system of claim 1 wherein said malfunction comprises a malfunction in said sensing means associated with said one wheel, and wherein said electronic regulating means regulates the braking effort applied to said one wheel based on the output signals produced by said sensing means associated with a second wheel mounted on a same axle as said one wheel.

4. A method for controlling operation of an anti-lock braking system installed on an all-wheel drive vehicle having first and second axles, wheels mounted on said first and second axles, brake cylinders and solenoid valves associated with each of said wheels, first and second intra-axle differentials, and an engageable inter-axle differential, said anti-lock braking system comprising wheel sensors associated with each of said wheels for sensing a rotational behavior of each of said wheels, and an electronic regulating unit for regulating a braking effort applied to each of said wheels, said method comprising detecting whether a malfunction associated with one of said wheels has occurred, determining whether said inter-axle differential is engaged or not, switching off regulation of the braking effort applied to said one wheel, and switching off regulation of the braking effort applied to a diagonally opposite wheel if said central differential is engaged.

5. The method of claim 4 further comprising, after said malfunction has been detected, regulating the braking effort applied to each wheel still being regulated based on the output signals produced by said wheel sensors associated with each of said still regulated wheels.

6. The method of claim 4 wherein if said malfunction comprises a malfunction in one of said wheel sensors, said method further comprises regulating the braking effort applied to said one wheel based on the output signals produced by said sensing means associated with a second wheel mounted on a same axle as said one wheel.

* * * * *